US008677641B2

(12) United States Patent
Panno, Jr.

(10) Patent No.: US 8,677,641 B2
(45) Date of Patent: Mar. 25, 2014

(54) ARTISTS RELATIVE MEASURING DEVICE

(76) Inventor: Nicholas J Panno, Jr., Stow, OH (US)

( * ) Notice: Subject to any disclaimer, the term of this patent is extended or adjusted under 35 U.S.C. 154(b) by 507 days.

(21) Appl. No.: 12/943,083

(22) Filed: Nov. 10, 2010

(65) Prior Publication Data

US 2011/0146097 A1 Jun. 23, 2011

Related U.S. Application Data

(63) Continuation-in-part of application No. 12/642,801, filed on Dec. 9, 2009, now Pat. No. 8,087,178.

(51) Int. Cl.
*B43L 13/16* (2006.01)
*G01B 3/04* (2006.01)
*B43K 29/08* (2006.01)

(52) U.S. Cl.
USPC .................................. 33/494; 33/483; 33/486

(58) Field of Classification Search
USPC ........... 33/1 K, 277, 483, 484, 485, 486, 494, 33/679.1, 759; 7/164, 167; 15/DIG. 11; 81/489, DIG. 5; 401/194, 195; 434/85, 434/90, 91; D4/138; D19/35, 36, 37, 47; D10/71
See application file for complete search history.

(56) References Cited

U.S. PATENT DOCUMENTS

| | | | | | |
|---|---|---|---|---|---|
| 60,315 | A | * | 12/1866 | Worchester | 401/52 |
| 494,921 | A | * | 4/1893 | Hayward | 7/105 |
| 1,677,387 | A | * | 7/1928 | Gaidos | 401/89 |
| D94,078 | S | * | 12/1934 | Erk | D10/71 |
| 2,388,252 | A | * | 11/1945 | Crane | 33/485 |
| 2,474,466 | A | * | 6/1949 | Carling | 33/277 |
| 2,501,757 | A | * | 3/1950 | Cagle | 7/145 |
| 2,525,644 | A | * | 10/1950 | Brunson | 33/228 |
| 2,792,992 | A | * | 5/1957 | Ellison | 235/79.5 |
| 3,175,296 | A | * | 3/1965 | Gadbury | 33/277 |
| 3,568,923 | A | * | 3/1971 | Chapman | 235/70 D |
| 4,159,571 | A | * | 7/1979 | Jervis, Jr. | 33/403 |
| 4,162,005 | A | * | 7/1979 | Linger | 206/362 |
| 4,497,117 | A | * | 2/1985 | Wrobley et al. | 33/276 |
| 4,970,797 | A | * | 11/1990 | Sarasin | 33/494 |
| 5,012,590 | A | * | 5/1991 | Wagner et al. | 33/759 |
| 5,820,183 | A | * | 10/1998 | Marcus | 294/57 |
| 6,145,215 | A | * | 11/2000 | Graston et al. | 33/759 |
| D446,462 | S | * | 8/2001 | Van Der Klok | D10/71 |
| 6,792,831 | B2 | * | 9/2004 | Crosser | 81/119 |
| 7,059,061 | B2 | * | 6/2006 | French | 33/494 |
| 2002/0148134 | A1 | * | 10/2002 | Meyer et al. | 33/758 |
| 2002/0166250 | A1 | * | 11/2002 | Jimenez et al. | 33/483 |
| 2003/0014876 | A1 | * | 1/2003 | Goldie | 33/558.02 |

FOREIGN PATENT DOCUMENTS

| | | | | | |
|---|---|---|---|---|---|
| GB | 02272 | | | 0/1916 | |
| GB | 07977 | A | | 0/1900 | |
| GB | 2323818 | A | * | 10/1998 | B43L 13/16 |
| GB | 2444054 | A | * | 5/2008 | C08K 5/00 |

OTHER PUBLICATIONS

Extended European Search Report for the European counterpart EP 2351653 to the present case, Oct. 1, 2012.

* cited by examiner

*Primary Examiner* — R. A. Smith
(74) *Attorney, Agent, or Firm* — Dominic Frisina

(57) ABSTRACT

Some embodiments of the present invention provide a plurality of approximately evenly spaced graduation marks disposed along the length of an art implement handle. Some embodiments may enable an artist to more accurately compare the relative sizes of different portions of his subjects so that he may depict them to scale, and or create a to-scale representation of an object.

5 Claims, 8 Drawing Sheets

ARTISTS RELATIVE MEASURING DEVICE

CROSS REFERENCE TO RELATED APPLICATIONS

This application is a continuation-in-part of U.S. patent application Ser. No. 12/642,801 filed Dec. 19, 2009 and now pending, which is incorporated herein by reference in its entirety.

I. BACKGROUND OF THE INVENTION

A. Field of Invention

Embodiments of this invention relate to art implements such as, without limitation, paintbrushes, pencils, mauls, chisels and other marking instruments.

B. Description of the Related Art

When artists create works of art based on observations of models or natural scenes, they are often interested in comparing the relative sizes of different portions of their subjects so that they might depict their subjects in proper proportion. One technique employed by many artists to gauge sizes is holding the handle of an art implement against their subject, observing the length of the subject relative to the handle, and translating the approximate length of the subject to their canvas, sculpture, or other medium by holding the handle against the medium.

This technique of measure is convenient, because it allows the artist to use the art implement he is already holding to measure scale, but it is also imprecise and requires repeated measurements since the measurement location on the art implement is lost after scaling. The artist "eyeballs," i.e. estimates, the relative length and only approximately translates this length to the work of art. Any slip of the finger or slight error in judgment can yield disproportion among various objects the artist is attempting to depict.

The present invention provides devices and methods for overcoming some shortcomings of the prior art. For example, some embodiments of the present invention may provide a means for more accurately estimating relative lengths using the handle of an artist's brush.

II. SUMMARY OF THE INVENTION

Some embodiments relate to an artist's relative measuring device, comprising: a fore-end and a rear-end spaced apart from the fore-end and defining an elongate handle member therebetween, wherein the handle member comprises a part of an art implement; and a plurality of evenly spaced graduation marks disposed about the length of the handle member, wherein the marks are visually perceptible.

In some embodiments the handle member is tapered towards a rear end.

In some embodiments the plurality of evenly spaced graduation marks is disposed on a medium selected from one or more of a transparent medium, an opaque medium or a colored medium, and wherein the medium is affixed to the handle member in a permanently joined relation.

In some embodiments the plurality of evenly spaced graduation marks is etched into a surface of the handle member.

In some embodiments the art implement comprises one or more of a paintbrush, a pencil, a pencil holder, a marker, a maul, a chisel, a pencil lengthener, charcoal extender, or any combination thereof.

In some embodiments the plurality of evenly spaced graduation marks extends 0 to 10 degrees, 10 to 20 degrees, 20 to 30 degrees, 30 to 40 degrees, 40 to 50 degrees, 50 to 60 degrees, 60 to 70 degrees, 70 to 80 degrees, 80 to 90 degrees, 90 to 100 degrees, 100 to 110 degrees, 110 to 120 degrees, 120 to 130 degrees, 130 to 140 degrees, 140 to 150 degrees, 150 to 160 degrees, 160 to 170 degrees, 170 to 180 degrees, 180 to 190 degrees, 190 to 200 degrees, 200 to 210 degrees, 210 to 220 degrees, 220 to 230 degrees, 230 to 240 degrees, 240 to 250 degrees, 250 to 260 degrees, 260 to 270 degrees, 270 to 280 degrees, 280 to 290 degrees, 290 to 300 degrees, 300 to 310 degrees, 310 to 320 degrees, 320 to 330 degrees, 330 to 340 degrees, 340 to 350 degrees, 350 to 360 degrees around a circumference of the handle member, or any combination thereof.

In some embodiments the plurality of evenly spaced graduation marks extends from about 0 to 270 degrees around a circumference of the handle member.

In some embodiments the plurality of evenly spaced graduation marks extends 360 degrees around a circumference of the handle member.

Some embodiments further comprise a slide member.

In some embodiments the slide member further comprises at least one contrast mark.

In some embodiments the plurality of graduation marks comprise a geometric shape selected from one or more of a line, a rectangle, a circle, an oval, a triangle, a polygon, an irregular shape, or any combination thereof.

In some embodiments the plurality graduation marks comprise an oval, a circle, a triangle a polygon, an irregular shape, or any combination thereof.

In some embodiments the plurality of graduation marks is arranged in an abutting pattern.

In some embodiments the plurality of graduation marks each comprise a color differing from at least one adjacent graduation mark.

In some embodiments the plurality of graduation marks each comprise a fill pattern differing from at least one adjacent graduation mark.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

Figure 3A:
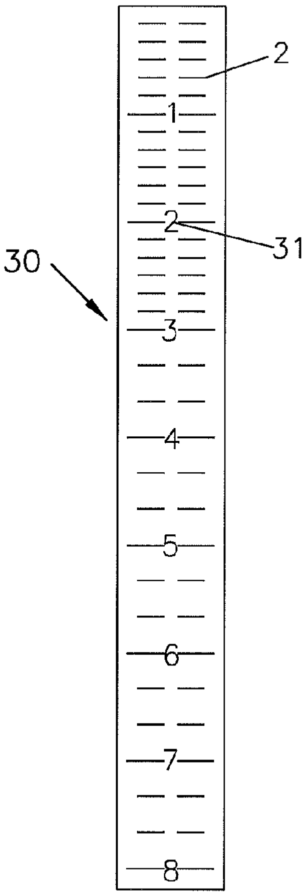

FIG. 3*a* depicts an embodiment comprising a transparent medium adapted to be affixed to the handle of a brush.

Figure 3B:
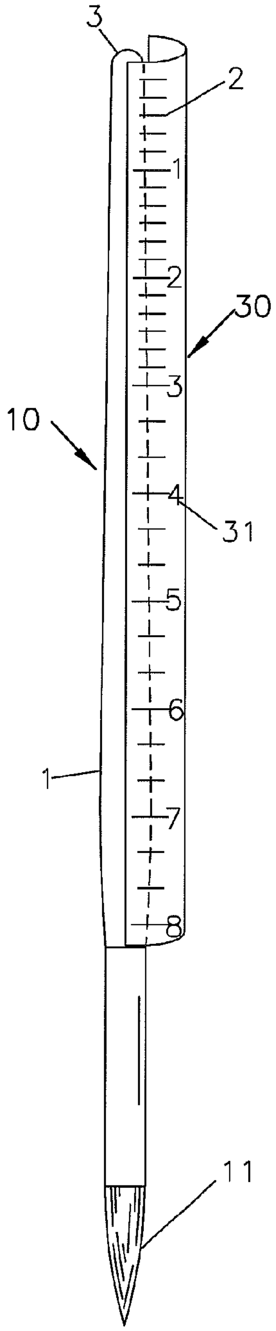

FIG. 3*b* is an exploded view of an embodiment comprising the transparent medium of FIG. 3*a* is shown in relation to a brush.

Figure 4:
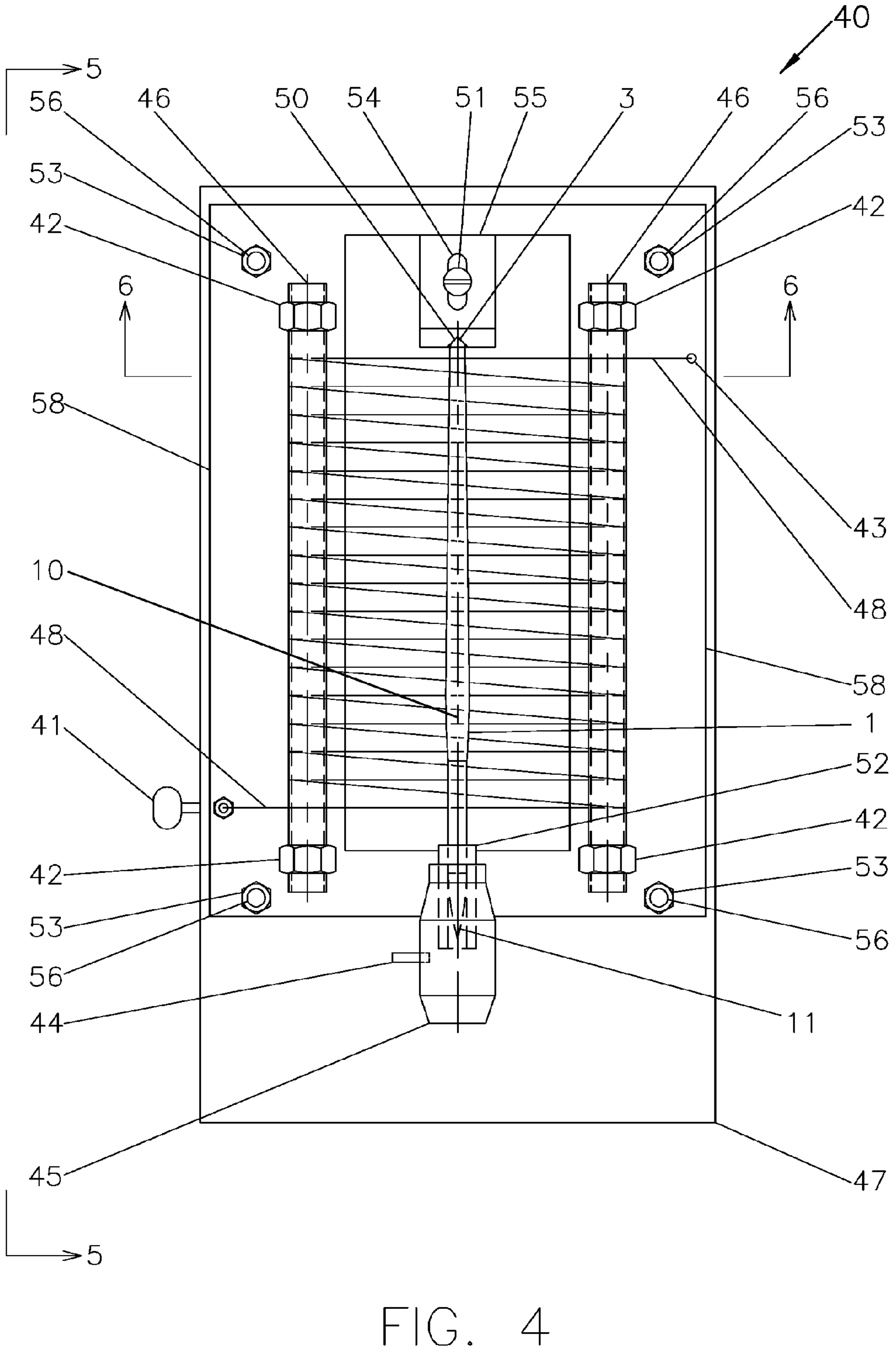

FIG. 4 depicts an overhead view of an embodiment comprising a handle marking device.

Figure 5:
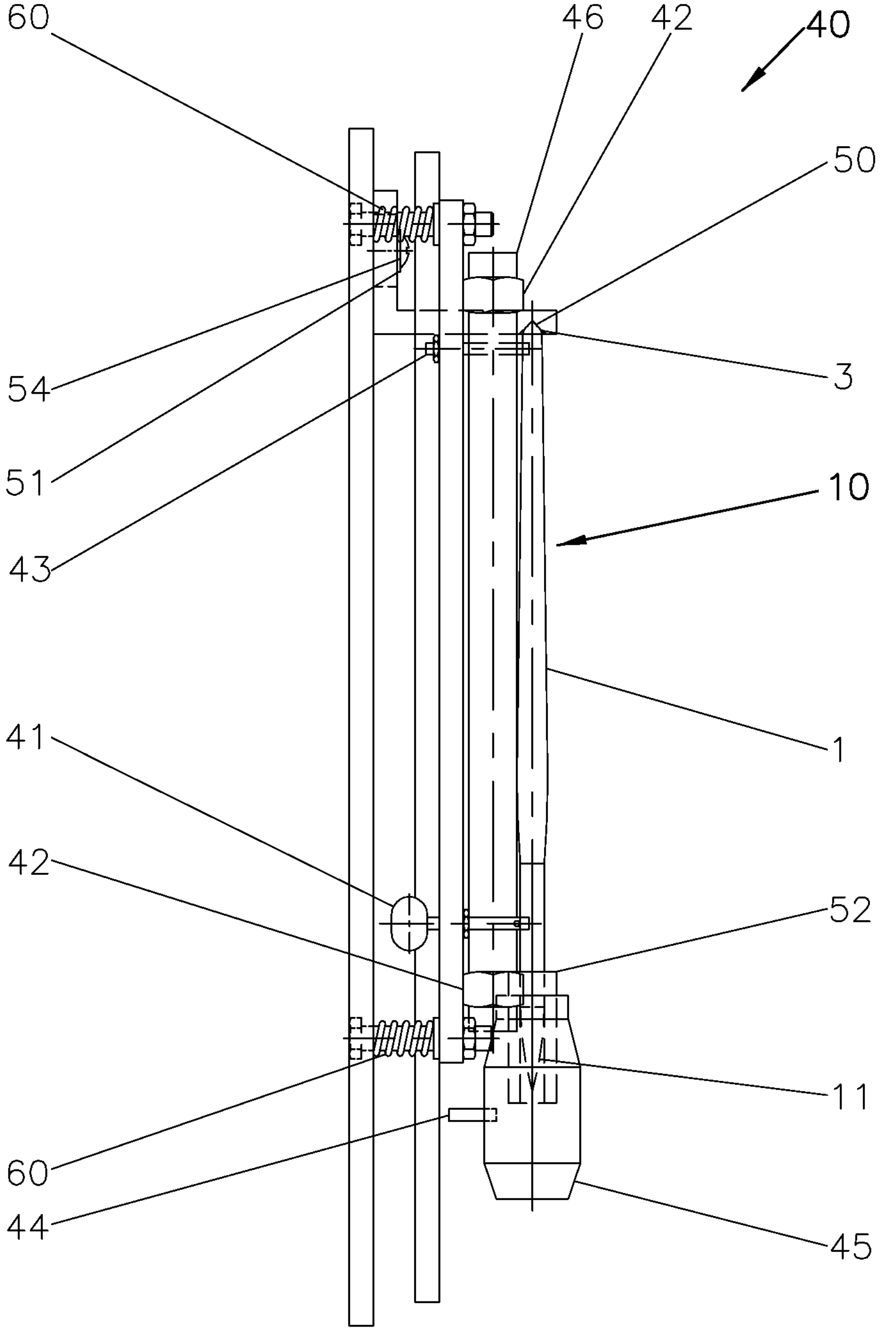

FIG. 5 depicts a side view of an embodiment comprising a handle marking device.

FIG. 6*a* is a plan view of an embodiment comprising a handle marking device.

FIG. 6*b* is a front view of an embodiment comprising a handle marking device.

Figure 7A:
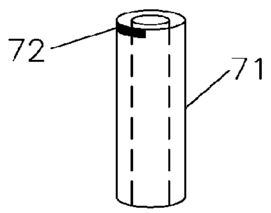
Figure 7B:
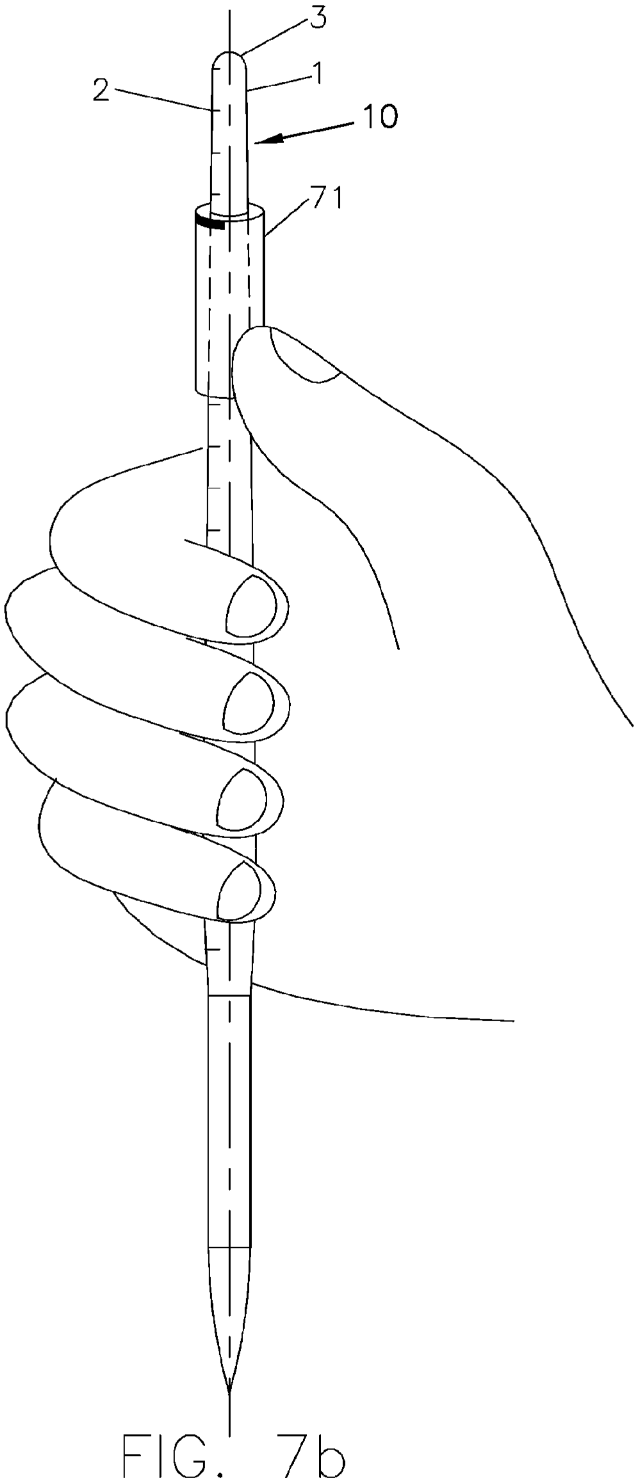

FIG. 7*a* is a perspective view of an embodiment comprising a slide;

FIG. 7*b* is a perspective view of an embodiment comprising a slide shown in relation to a graduated brush handle of the present invention.

Figure 8:
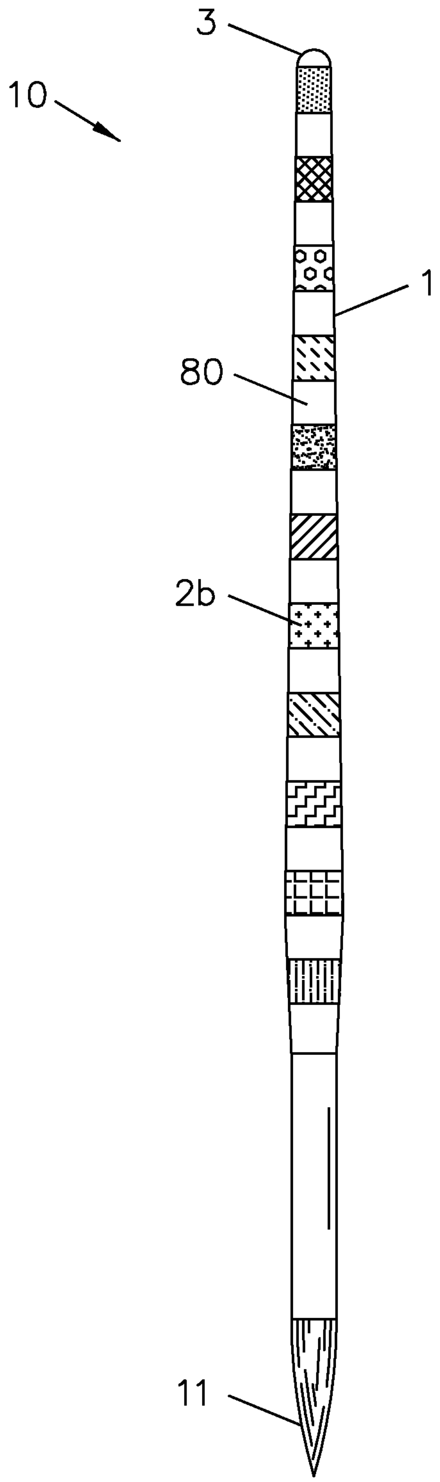

FIG. 8 is a perspective view of an embodiment comprising a brush handle having painted-on graduations in the nature of thick parallel bands of varying color or fill-pattern.

Figure 9:
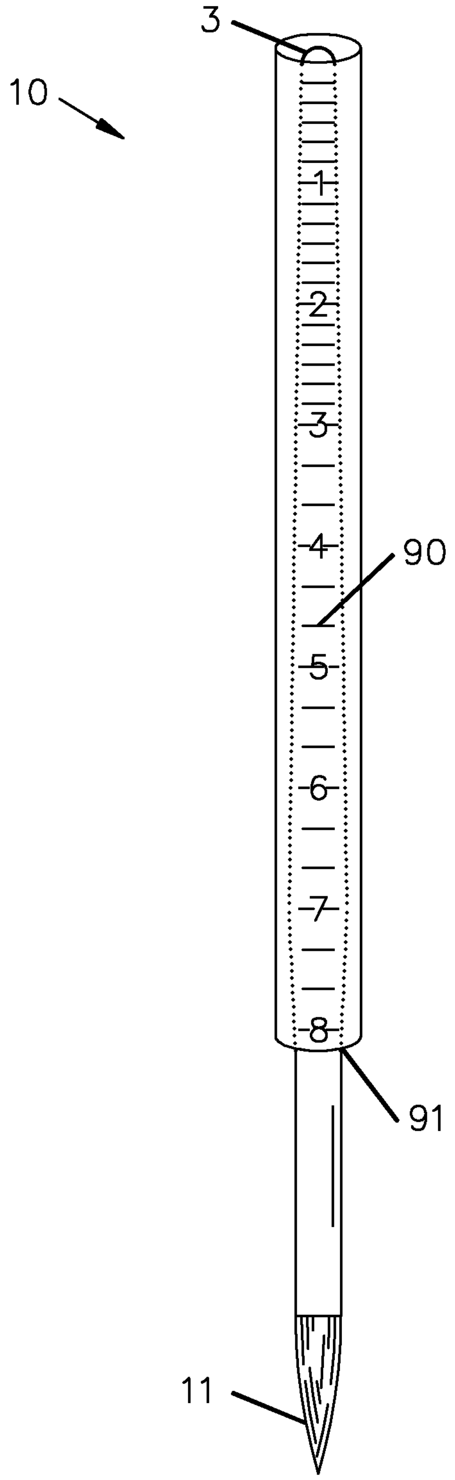

FIG. 9 is a perspective view of an embodiment comprising a brush handle enveloped in a shrink-wrap bearing a graduation pattern.

Figure 10:
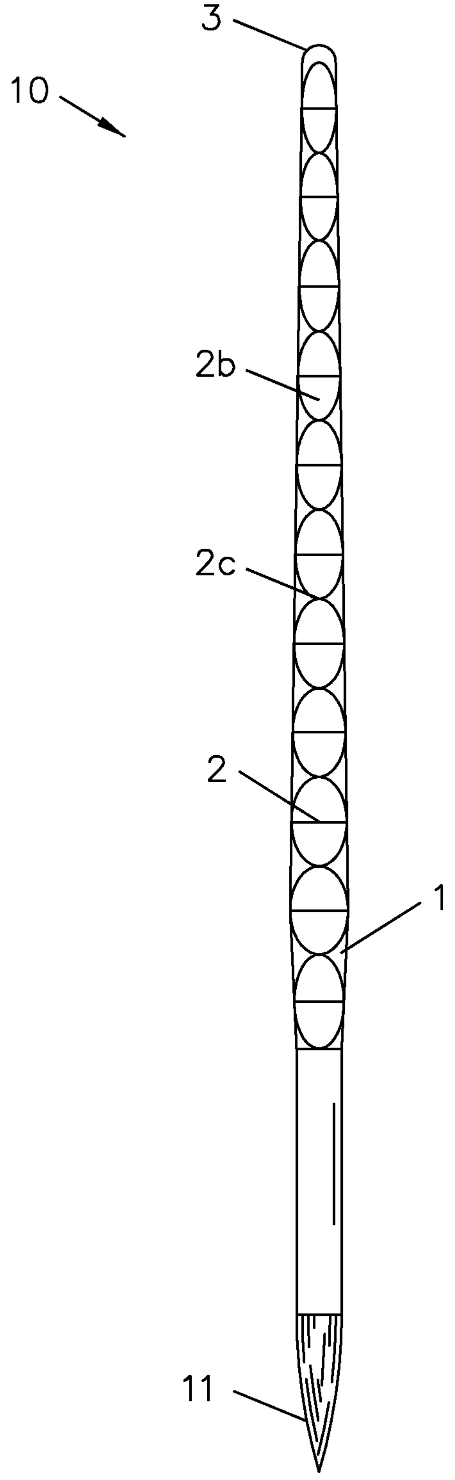

FIG. 10 is a perspective view of an embodiment comprising a brush handle having painted-on graduations in the nature of abutting oval shapes.

IV. DETAILED DESCRIPTION OF THE INVENTION

According to an embodiment, an art implement can include a plurality of visually perceptible graduation marks that are substantially evenly spaced and suitable for visually judging relative size of objects and/or aiding a user in the reproduction of the dimensions of an object and/or in the scaling of the dimensions of one object relative to another. In some embodiments the art implement is a paintbrush handle; however, appropriate art implements can include other devices as well. Some embodiments may optionally include a slide member for recording a dimension on the art implement by positioning the slide relative to a selected graduation.

Figure 1:
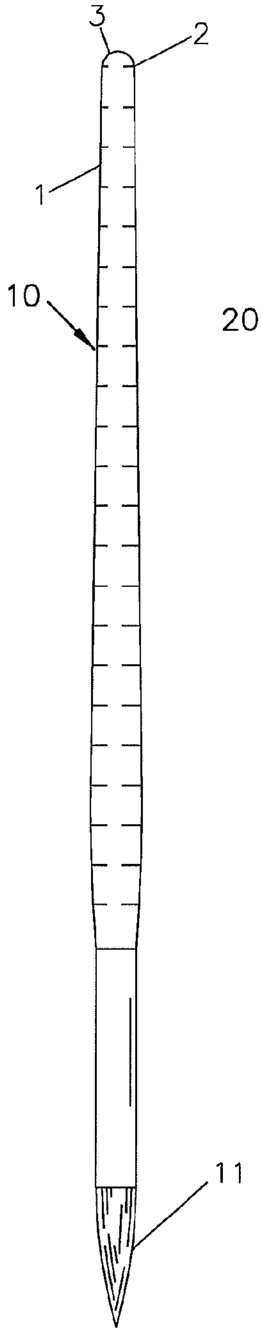
FIG. 1 depicts a paintbrush with handle comprising an embodiment of the invention.
Figure 2:
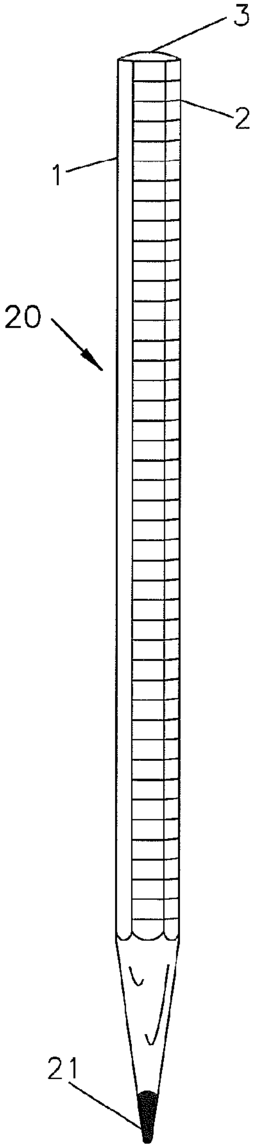
FIG. 2 depicts a pencil with handle comprising an embodiment of the invention.

Referring now to the drawings wherein the showings are for purposes of illustrating embodiments of the invention only and not for purposes of limiting the same, FIGS. 1 and 2 depict art implements according to embodiments of the invention. FIG. 1 illustrates a paintbrush 10 with a brush head 11 and a handle 1. FIG. 2 illustrates a pencil 20 with a writing point 21 and a handle 1. In FIG. 1 and FIG. 2, the handle 1 may have a rear end 3 which is disposed opposite the brush head 11 and the writing point 21 respectively. Each handle 1 also may have a series of marks 2 disposed between the rear end 3 and the brush head 11 or the writing point 21 at regular intervals. It is noted that while FIG. 1 presents a paintbrush 10 and FIG. 2 presents a pencil 20, other art implements which have handles 1 may also be used in alternate embodiments of the invention. Examples of such art implements may include a maul, a chisel, a pencil lengthener, a charcoal extender, or other art implement. It is further noted that while FIGS. 3 and 7 illustrate a paintbrush 10, the features of the invention depicted in FIGS. 3 and 7 may be found in alternate embodiments of the invention using a pencil 20 or other art implements which have handles 1.

The marks 2 on the handle 1 may allow a user of an art implement to measure the length of a subject and translate that length to a medium such as a canvas or paper. In some embodiments of the invention, the marks 2 may also serve a secondary function by improving the grip of the handle 1 or providing an aesthetic appeal. In some embodiments of the invention, numbers 31 may be disposed adjacent to some or all of the marks 2, as depicted in FIG. 3.

In an embodiment of the invention, the handle 1 may taper towards the rear end 3, as depicted in FIG. 1. In other embodiments, such as that depicted in FIG. 2, the handle may maintain a constant width along its entire length.

In an embodiment of the invention, the graduation marks 2 may extend, for example, about 270 degrees around the circumference of the handle 1 or some other suitable distance. Examples of suitable distances include, without limitation, from about 0 to 10 degrees, 10 to 20 degrees, 20 to 30 degrees, 30 to 40 degrees, 40 to 50 degrees, 50 to 60 degrees, 60 to 70 degrees, 70 to 80 degrees, 80 to 90 degrees, 90 to 100 degrees, 100 to 110 degrees, 110 to 120 degrees, 120 to 130 degrees, 130 to 140 degrees, 140 to 150 degrees, 150 to 160 degrees, 160 to 170 degrees, 170 to 180 degrees, 180 to 190 degrees, 190 to 200 degrees, 200 to 210 degrees, 210 to 220 degrees, 220 to 230 degrees, 230 to 240 degrees, 240 to 250 degrees, 250 to 260 degrees, 260 to 270 degrees, 270 to 280 degrees, 280 to 290 degrees, 290 to 300 degrees, 300 to 310 degrees, 310 to 320 degrees, 320 to 330 degrees, 330 to 340 degrees, 340 to 350 degrees, 350 to 360 degrees or any combination thereof. Here as elsewhere in the specification and claims, ranges may be combined. Extending the graduation marks in this way may allow a manufacturer of an art implement to display a trademark or other symbol without the marks 2 obscuring the design. Alternatively, the marks 2 may extend around the entire 360 degree circumference of the handle 1, or some of the marks 2 may extend the entire circumference of the handle 1 and other marks 2 may extend less than the circumference of the handle 1.

In an embodiment of the invention depicted in FIG. 7, a slide 71 may be disposed on they handle 1. One or more contrast marks 72 may be disposed on the slide 71. The slide 71 may be adjustable by a user. The slide 71 may allow a user to more easily use the marks 2 to measure the length of a subject.

In an embodiment of the invention depicted in FIG. 3, the marks 2 may be deposited on the handle 1 by first being created on a transparent medium 30, which may be affixed to the handle 1 by adhesive means. In other embodiments the medium 30 may be opaque and/or may include a colorizing component. In an alternative embodiment of the invention, the transparent medium 30 may be a heat-sensitive medium 90 which may be placed around the handle 1 and may be affixed by applying heat to the transparent medium 30 to shrink it around the handle 1. In other embodiments, the heat sensitive medium 90 may be opaque and/or may include a colorizing component. In an alternative embodiment of the invention, the marks 2 may be drawn on the handle 1. In an alternative embodiment of the invention, the marks 2 may be etched on the handle 1. An embodiment of a handle marking device 40 which can etch the marks 2 onto the handle 1 is described below.

Figure 6:
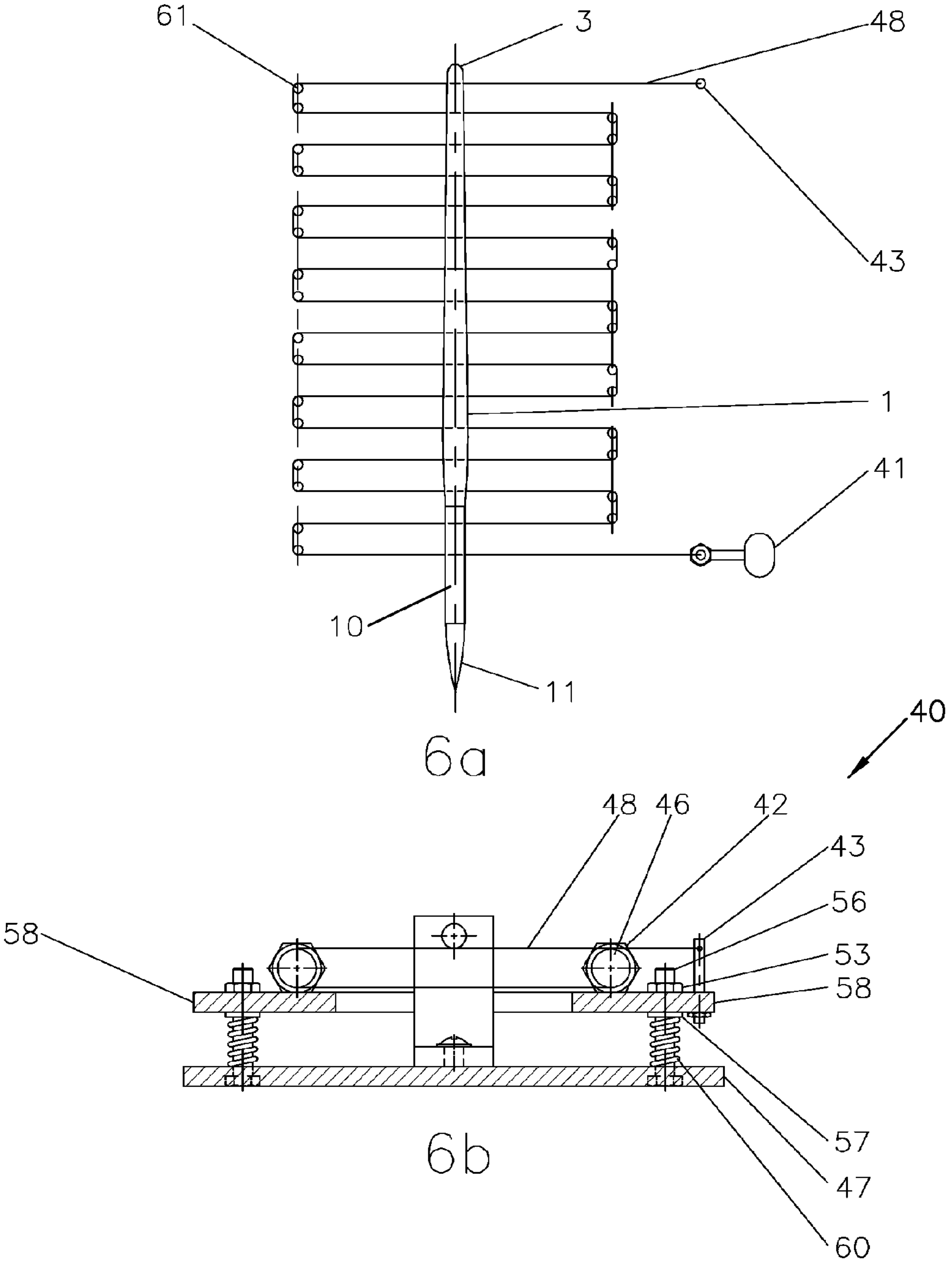

FIGS. 4, 5, and 6 depict an embodiment of a handle marking device 40. FIG. 4 provides an overhead view of the handle marking device 40. FIG. 5 provides a side view of the handle marking device 40. An embodiment of the handle marking device 40 may include a base 47 onto which other elements of the handle marking device 40 may be mounted. In an embodiment of the invention, an etching base 58 may be mounted to the base 47. The etching base 58 may be mounted in such a way as to be height and level adjustable in an embodiment of the invention. In other embodiments the etching base 58 may be mounted in a fixed state.

In an embodiment of the invention the etching base 58 may be provided with elements to allow for centering of an art implement, which is shown in FIGS. 4, 5, and 6 as a paint brush 10. A centering recess bracket 55 may be disposed on the etching base 58. A centering recess 50 may be disposed on the centering recess bracket 55. The centering recess 50 may accept the rear end 3 of an art implement. In an embodiment of the invention, the centering recess 50 may be adjustable by means of an adjustment slot 54. In an embodiment of the invention, a bearing may be disposed in the centering recess 50 to allow the handle 1 to rotate more easily. This adjustment allows art implements of varying lengths to be accommodated. In an embodiment of the invention, the adjustment slot may be adjusted through the use of a set screw 51. In an embodiment of the invention, the art implement may also be secured on its opposite end. In the embodiment shown in FIGS. 4 and 5 a brush head 11 is depicted, but in other embodiments this may be a writing point 21 or other marking end. A centering chuck 45 may be disposed on the handle marking device 40 to accept the brush head 11. In an embodiment of the invention, a stop 44 may be disposed on the handle marking device 40 near the centering chuck 45 to stop rotation of the art implement. In an embodiment of the invention, a protective bushing 52 may also be disposed to cover the brush head 11.

In an embodiment of the invention, etching wire 48 may be provided to etch marks into the art implement handle 1. The etching wire 48 may be attached to the etching base 58 by a tension wire anchor 43. In an embodiment shown in FIG. 4, the etching wire 48 is then disposed along one or more tension wire support rods 46 in such a way as to result in an evenly spaced series of etching wires 48 passing over an art implement handle 1. The one or more tension wire support rods 46 may be disposed on the etching base 58 through the use of one or more stand-offs 42. In an embodiment of the invention shown in FIG. 6*a*, one or more pins 61 may be disposed at intervals on the etching base 58 and the tension wire support rods 46 may be omitted. In this embodiment the pins 61 may support the etching wire 48 in such a way as to result in an evenly spaced and substantially parallel series of etching wires 48 passing over an art implement handle 1. In an embodiment of the invention the tension of the etching wire 48 may be adjusted using a tension adjustment 41. In an embodiment of the invention, the etching wires 48 may be covered in a dye to create the marks 2 on the art implement handle 1.

FIGS. 5 and 6*b* depict an embodiment of the invention wherein the etching base 58 may be attached to the base 47 in an adjustable fashion. An adjustable attachment may allow a user to adjust the etching base 58 to accommodate irregularly shaped implement handles 1. In an embodiment of the invention, one or more leveling adjustment pins 56 attach the etching base 58 to the base 47. A spring 60 and a washer 57 may be disposed on each leveling adjustment pin 56 to provide tension. The level of the etching base 58 may be adjusted through the use of one or more leveling adjustment screws 53 disposed on each of the one or more leveling adjustment pins 56.

In the embodiments previously described, an art implement handle 1 may be etched with marks 2. One non-limiting example of this operation is as follows. A user may place an art implement, such as a paint brush 10, into the handle marking device 40 as depicted in FIGS. 4 and 5, with the rear end 3 in the centering recess 50 and the brush head 11 in the centering chuck 45. Leveling adjustment pins 56 may be adjusted and the tension adjustment 41 may be adjusted to ensure contact between the etching wire 48 and the handle 1. When the centering chuck 45 is turned, the handle 1 turns and the etching wire 48 etches marks 2 into the handle 1.

FIG. 8 is a perspective view drawing of an embodiment comprising a paint brush 10 includes a brush head 11 disposed at a fore-end of a brush handle member 1 and distal to a rear-end 3 thereof. The embodiment further comprises a plurality of geometric graduation marks 2*b* substantially evenly spaced apart by contrast areas 80 that visually contrast with the geometric graduation marks 2*b*. According to some embodiments visual contrast may be promoted by using different colors and/or fill patterns for the geometric graduation marks 2*b* versus the contrast areas 80. Furthermore, in some embodiments the geometric graduation marks 2*b* can each comprise one of a plurality of colors and/or fill patters so that each geometric graduation mark 2*b* differs visually from each of the other marks 2*b*. Such embodiments may promote the user remembering which mark he has selected for a given measurement.

With continuing reference to FIG. 8, according to some embodiments, the geometric graduation marks 2*b* can comprise generally rectangular band shapes. However, in other embodiments, as in FIG. 10, the geometric graduation marks 2*b* can comprise other geometric shapes such as ovals, which may or may not encircle a circumference of a handle 1. According to the embodiment of FIG. 10, the areas where the ovals 2*b* abut 2*c* are akin to the graduation marks 2 of FIG. 8. In an alternate embodiment additional linear graduation marks 2 can be included along with the geometric graduation marks 2*b*. Furthermore, similar embodiments are envisioned including geometric graduation marks 2*b* comprising any of a variety of geometric shapes alone or in combination such as, without limitation, circles, triangles, and higher polygons. Still further, in some embodiments the graduation marks 2*b* may be irregularly shaped.

With reference to FIG. 9, in still other embodiments graduation marks 2 and/or geometric graduation marks 2*b* can be applied to an art implement such as a paint brush 10 using a heat sensitive medium 90 that shrinks in response to applied heat, thereby affixing the material to the implement. According to such embodiments, the graduation marks 2 and/or 2*b* may be applied to the heat sensitive medium 90 either before or after affixing the heat sensitive medium 90 to the implement. Optionally, an edge 91 of the heat sensitive medium 90 may be left visible or may be hidden, or mated flush to an edge of, for instance, a brush head 11.

Embodiments of the invention have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

I claim:

1. An artist's relative measuring device, comprising:

a fore-end and a rear-end spaced apart from the fore-end and defining an elongate handle member therebetween, wherein the handle member comprises a part of an art implement selected from the group consisting of a paintbrush, a pencil, a pencil holder, and an ink marker, a maul, a chisel, a pencil lengthener, a charcoal extender or any combination thereof; and a plurality of evenly spaced graduation marks disposed about the length of the handle member, wherein the marks are visually perceptible, wherein the plurality of graduation marks comprise a geometric shape selected from the group consisting of a line, a rectangle, a circle, an oval, a triangle, a polygon, an irregular shape, or any combination thereof, and wherein, the plurality of graduation marks is arranged in an abutting pattern.

2. The device of claim 1, wherein the plurality of evenly spaced graduation marks is disposed on a medium selected from one or more of a transparent medium, an opaque medium or a colored medium, and wherein the medium is affixed to the handle member in a permanently joined relation.

3. The device of claim 1, further comprising a slide member coaxial with the elongate handle member and adapted to align with a selected graduation mark.

4. The device of claim 1, wherein the plurality of graduation marks each comprise a color differing from at least one adjacent graduation mark.

5. The device of claim 1, wherein the plurality of graduation marks each comprise a fill pattern differing from at least one adjacent graduation mark.

* * * * *